US012563619B2

(12) United States Patent
Dong

(10) Patent No.: US 12,563,619 B2
(45) Date of Patent: Feb. 24, 2026

(54) MULTI-LINK RE-SETUP METHOD AND APPARATUS, AND STORAGE MEDIUM

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 347 days.

(21) Appl. No.: 18/001,651

(22) PCT Filed: Jul. 31, 2020

(86) PCT No.: PCT/CN2020/106374
§ 371 (c)(1),
(2) Date: Dec. 13, 2022

(87) PCT Pub. No.: WO2022/021403
PCT Pub. Date: Feb. 3, 2022

(65) Prior Publication Data
US 2023/0262799 A1 Aug. 17, 2023

(51) Int. Cl.
*H04W 8/00* (2009.01)
*H04W 8/26* (2009.01)
*H04W 12/0431* (2021.01)
*H04W 76/15* (2018.01)

(52) U.S. Cl.
CPC ............. *H04W 76/15* (2018.02); *H04W 8/26* (2013.01); *H04W 12/0431* (2021.01)

(58) Field of Classification Search
None
See application file for complete search history.

(56) References Cited

U.S. PATENT DOCUMENTS

2018/0332471 A1* 11/2018 Zhu ........................ H04L 63/061
2019/0335454 A1* 10/2019 Huang ................ H04W 88/085
2020/0037152 A1 1/2020 Seok et al.
2020/0221545 A1 7/2020 Stacey et al.
2021/0212156 A1* 7/2021 Kwon ................... H04W 76/34
2024/0090059 A1* 3/2024 Gan ..................... H04W 74/002

FOREIGN PATENT DOCUMENTS

CN 111066271 A1 4/2020

OTHER PUBLICATIONS

Extended European Search Report issued in Application No. 20947710.8 dated Feb. 20, 2024, 9 pages.
Edward Au; Huawei, IEEE 802.11-19/1262r11, Jul. 11, 2020, 41 pages.
International Search Report and Written Opinion of International Application No. PCT/CN2020/106374, mailed Apr. 19, 2021, 14 pages.

* cited by examiner

*Primary Examiner* — Abdelillah Elmejjarmi
(74) *Attorney, Agent, or Firm* — Finnegan, Henderson, Farabow, Garrett & Dunner, L.L.P.

(57) ABSTRACT

A multi-connection reestablishment method, for use in a first device, and comprising: sending a first message frame, the first message frame comprising: a connection identifier of multiple connections of a first device and a second device, and media access control MAC addresses of the first device, one connection being associated with one MAC address of the first device.

6 Claims, 5 Drawing Sheets

MULTI-LINK RE-SETUP METHOD AND APPARATUS, AND STORAGE MEDIUM

CROSS-REFERENCE TO RELATED APPLICATION

This application is a national phase of International Application No. PCT/CN2020/106374, filed on Jul. 31, 2020, the content of which is hereby incorporated by reference in its entirety.

TECHNICAL FIELD

The disclosure relates to, but is not limited to, a field of wireless communication technologies, and particularly relates to a multi-link re-setup method, a multi-link re-setup apparatus and a storage medium.

BACKGROUND

The research on Wireless Fidelity (Wi-Fi) technology has become a hot research topic in recent years, and the scope of research on the Wi-Fi technology includes transmission on the bandwidth up to 320 MHz and the aggregation and cooperation of multiple frequency bands. The vision proposed by the research includes: increasing the rate, improving the throughput and reducing the latency. The main application scenarios include video transmission, augmented reality, and virtual reality.

The study of aggregation and cooperation of multiple frequency bands in the Wi-Fi technology requires communicating between devices in the 2.4 GHz, 5.8 GHz and 6-7 GHz frequency bands at the same time. In the related art, a multi-link reset mechanism is defined for operating in multiple frequency bands, in which the request message frame is used to make an association request. However, in the related art, the request message frame is only applicable to establishing a single link and is not suitable for the aggregation and cooperation of multiple frequency bands.

SUMMARY

According to a first aspect of the disclosure, a multi-link re-setup method performed by a first device is provided. The method includes:

sending a first message frame, in which the first message frame includes:

link identifiers of multiple links between the first device and a second device and Media Access Control (MAC) addresses of the first device, and the multiple links are associated with the MAC addresses of the first device one by one respectively.

According to a second aspect of the disclosure, a multi-link re-setup method performed by a second device is provided. The method includes:

receiving a first message frame sent by a first device; and in response to the first message frame, sending a second message frame, in which the second message frame includes: link identifiers of multiple links between the first device and the second device and MAC addresses of the second device, and the multiple links are associated with the MAC addresses of the second device one by one respectively.

According to a third aspect of the disclosure, a multi-link re-setup device is provided. The device at least includes: a processor and a memory for storing instructions executable by the processor. When the executable instructions are executed by the processor, the above multi-link re-setup method is implemented.

According to a fourth aspect of the disclosure, a non-transitory computer-readable storage medium storing computer-executable instructions is provided. When the computer-executable instructions are executed by a processor, the above multi-link re-setup method is implemented.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms "first", "second", and "third" may be used in this disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

To better describe embodiments of the disclosure, the embodiments of the disclosure are illustrated in a wireless communication scenario of a device supporting the multi-link communication.

Figure 1:
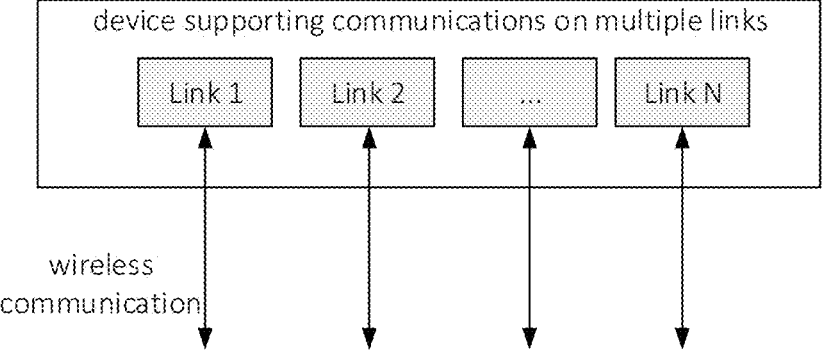
FIG. 1 is a schematic diagram illustrating a communication principle of a multi-link device according to some embodiments.

As illustrated in FIG. 1, the embodiments of the disclosure provide a wireless communication scenario of a device supporting communications on multiple links. In this application scenario, the device supports multi-link communications. Here, the multiple links include link 1, link 2, . . . , and link N, where N is a positive integer. When the device supporting the multi-link communications performs wireless communication with an Access Point (AP), data may be transmitted on each of multiple links.

Figure 2:
FIG. 2 is a first flowchart illustrating a multi-link re-setup method according to some embodiments.

As illustrated in FIG. 2, embodiments of the disclosure provide a multi-link re-setup method performed by a first device. The method includes the following.

At step S101, a first message frame is sent. The first message frame includes: link identifiers of multiple links between the first device and a second device and MAC addresses of the first device, and the multiple links are associated with the MAC addresses of the first device one by one respectively.

In embodiments of the disclosure, both the first device and the second device described above are electronic devices that support the multi-link communications. The first device or the second device may be any device capable of accessing the AP and supporting the multi-link communications, which includes but is not limited to: a cell phone, a smart home device and/or a smart office device. This kind of devices is also called as non-AP-Multi-link device (non-AP MLD). Further, the first device or the second device may be an AP device, including but not limited to: a wireless router, or devices such as cell phones and laptops with a "Ad-hoc" function.

The "multi-link" and the "multiple links" can refer to multiple bandwidths within one frequency band. The frequency band may be 2.4 GHz, 5 GHz or 6-7 GHz. The bandwidth can refer to a bandwidth of a frequency spectrum on which a device operates in the frequency band, such as, 20 MHz and 40 MHz. One link corresponds to one bandwidth.

In some embodiments, the multiple links can be: links of a Basic Service Set (BSS) consisting of same channel bandwidths within the same frequency band or different channel bandwidths within the same frequency band, or links of a BSS consisting of same or different channel bandwidths of different frequency bands.

Here, the multiple links can be understood as multiple channels for transmitting data. For example, each of the multiple links corresponds to a respective channel for transmitting data. There may be multiple links between a device and the AP in a wireless communication system, for example, the link 1, the link 2 and so on. The device that support the multi-link communications can transmit or receive data on multiple links.

In some embodiments, the multiple links include link 1, link 2, . . . , and link N, where N is a positive integer. All the links refer to N links from the link 1 to the link N.

In some embodiments of the disclosure, the multiple links refer to communication links between the first device and the second device, and each of the multiple links has a respective link identifier.

In some embodiments of the disclosure, the re-setup of multiple links refers to re-initiating an association request to associate with the second device or a link setup request when requiring to reset the multiple links. The second device may be a device with which links had been set up before the re-setup of the links or may be a device different from the device with which links had been set up before the re-setup of the links. The re-setup of the links includes changing a configuration of the multiple links, for example, adding and/or reducing a link, and changing the MAC address of a link.

Here, the multiple links of the first device may have different MAC addresses. Correspondingly, the multiple links through which the second device is associated with the first device may have different MAC addresses.

Therefore, in embodiments of the disclosure, information units carried in the first message frame include: link identifiers of the multiple links and MAC addresses, and the multiple links correspond to the MAC addresses one by one respectively.

In this way, the first device can send all the link identifiers of links to be reset and corresponding MAC addresses to the second device uniformly through the first message frame, to facilitate the re-setup of links between the first device and the second device. Compared with a message frame including only one link identifier and/or one MAC address, the first message frame can facilitate the rapid re-setup of multiple links, so that the devices can communicate on the multiple links, which effectively saves the signaling overhead and reduces the power consumption generated by the device during the re-setup process.

In some embodiments, in response to that the first device supports a communication on one link at a time point, the MAC addresses associated with the multiple links are the same or different; and/or, in response to that the first device supports communications on at least two links at a time point, the MAC addresses associated with the multiple links are different.

In the embodiments of the disclosure, there may be multiple links established between the first device and the second device, and communication states of the multiple links may be synchronous and parallel or may be polled. That is, when the communications on the multiple links are polled, the communications on the multiple links may be performed separately at different times. Therefore, for this case, the multiple links can share the same MAC address without causing any data transmission error. Certainly, different links can have different MAC addresses. Correspondingly, the MAC addresses corresponding to the multiple links carried in the first message frame may be the same MAC addresses or different MAC addresses.

For the first device that supports communications on at least two links at a time point, such as, a cell phone capable of sending and receiving data in parallel on the multiple links of different frequency bands at the same time, if the same MAC address is still used for the multiple links, confliction between different links may occur, which may lead to data transmission errors. Therefore, in this case, the multiple links can be distinguished using different MAC addresses. Correspondingly, the MAC addresses corresponding to the multiple links carried in the first message frame are different MAC addresses.

It is noteworthy that, as a special case, when the first device supports the communications on at least two links at a time point, the same MAC address may be used for different links. However, different encryption processes are performed on the MAC addresses of different links. At this time, the first message frame can carry encrypted MAC addresses.

In some embodiments, the method further includes receiving a ciphertext of an encryption key; and determining an encryption key corresponding to a link by decrypting the ciphertext based on an MAC address associated with the link.

In some embodiments, the encryption keys for sending and receiving data can be encrypted using the MAC addresses of different links. Therefore, after receiving an encrypted ciphertext, the first device can decrypt the ciphertext according to the MAC address associated with a link path of the received ciphertext. In this way, different links can be decrypted using different MAC addresses, and the ciphertexts of different links will not affect each other, thereby improving the security of the data ciphertext.

In some embodiments, the first message frame includes: a multi-link re-setup request message frame or a re-association request message frame.

In embodiment of the disclosure, the first message frame may be a multi-link re-setup request message frame or a re-association request message frame initiated by the first device, which are used to request the re-association with the second device or to re-set up multiple links.

The re-setup request message frame or the re-association request message frame may carry relevant information indicating the performance of the first device itself, such as the performance of the network to which the first device is connected, the support rate and the MAC addresses of the connected AP, in addition to the link identifiers of the multiple links and the MAC addresses described above. In addition, the re-setup request message frame or the re-association request message frame may also carry a configuration of links to be reset.

The re-setup request message frame or the re-association request message frame may be used to inform the second device of the relevant parameters of the link to be set up, thereby enabling the re-association and the re-setup of the multiple links with the second device.

Figure 3:
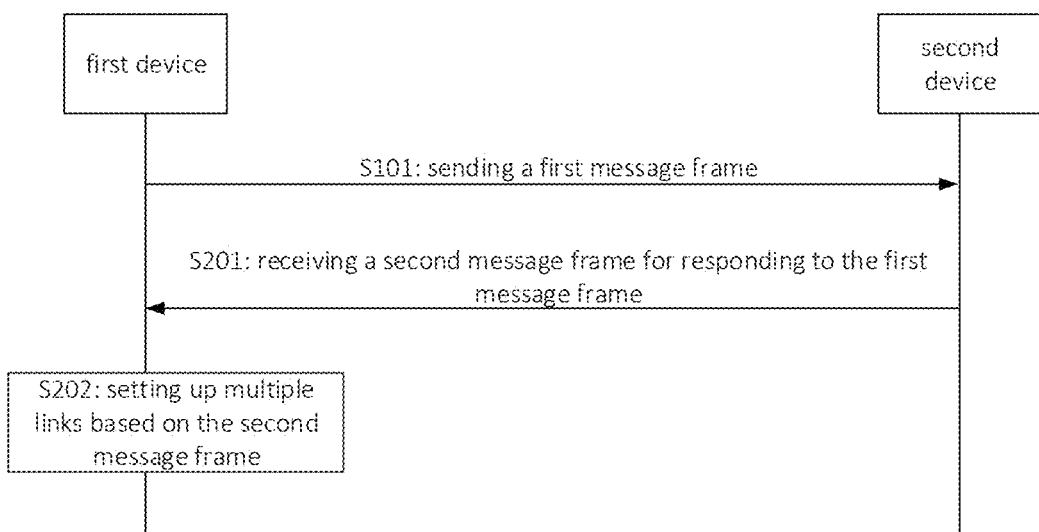
FIG. 3 is a second flowchart illustrating a multi-link re-setup method according to some embodiments.

In some embodiments, as illustrated in FIG. 3, the method further includes the following.

At step S201, a second message frame for responding to the first message frame is received.

At step S202, the multiple links are set up based on the second message frame.

In embodiment of the disclosure, after the first device sends the first message frame to the second device, if the second device can re-set up the multiple links with the first device, the second device can send back a corresponding response message to the first device. The response message may be the second message frame described above. Certainly, if the second device cannot re-set up the multiple links with the first device, the second device may send a corresponding second message frame to the first device, to inform the first device of the failure of the re-setup.

Therefore, when the first device receives the second message frame for responding to the first message frame, the first device can complete the setup of the multiple links based on the relevant information carried in the second message frame.

In some embodiments, the second message frame includes: link identifiers of the multiple links and MAC addresses of the second device, and the multiple links are associated with the MAC addresses of the second device one by one respectively.

In some embodiments of the disclosure, the above second message frame may carry the parameters such as the MAC addresses required to re-set up the multiple links, in addition to a response message indicating whether the multiple links with the first device can be re-set up.

Since the multiple links between the first device and the second device may be used simultaneously to send and receive data, both parties need to inform each other of their MAC addresses of each of the multiple links.

In some embodiments of the disclosure, similar to the first message frame, the information units carried in the second message frame include: link identifiers of the multiple links and corresponding MAC addresses. It is understandable that since the multiple links are set up between the first device and the second device, the link identifier of a link in the first message frame can be the same as the link identifier of the same link in the second message frame for mutual confirmation of the link between the first device and the second device. The first device and the second device have their own MAC addresses, and thus the MAC addresses corresponding to the multiple links in the first message frame are the MAC addresses of the first device, and the MAC addresses corresponding to the multiple links in the second message frame are the MAC addresses of the second device.

In this way, the multiple links can be easily set up between the first device and the second device through the interaction using the first message frame and the second message frame, to realize the cooperation of the multiple links.

Figure 4A:
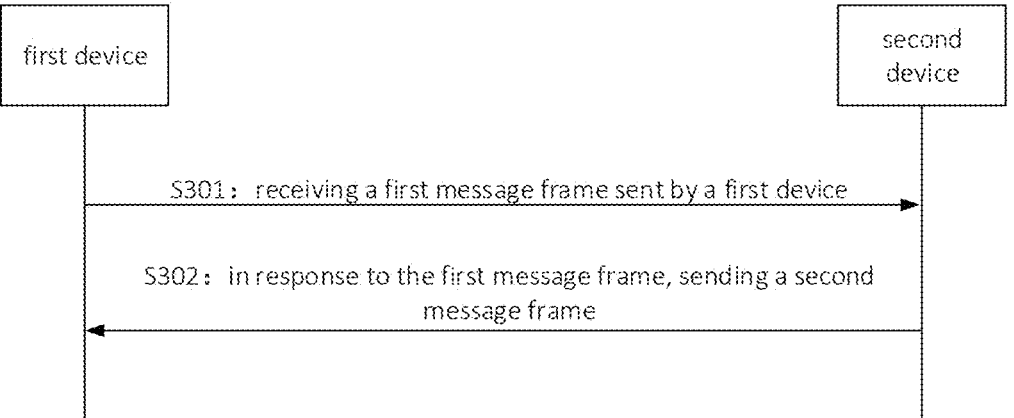
FIG. 4A is a third flowchart illustrating a multi-link re-setup method according to some embodiments.

As illustrated in FIG. 4A, embodiments of the disclosure provide a multi-link re-setup method performed by a second device. The method includes the following.

At step S301, a first message frame sent by a first device is received.

At step S302, in response to the first message frame, a second message frame is sent. The second message frame includes: link identifiers of multiple links between the first device and the second device and MAC addresses of the second device, and the multiple links are associated with the MAC addresses of the second device one by one respectively.

The second device may respond to the request sent by the first device. After the second device receives the first message frame sent by the first device, the second device allocates communication resources for connections based on the link identifiers and the corresponding MAC addresses of the first device carried in the first message frame, and informs the first device of the MAC addresses of the second device corresponding to the links to be set up.

Therefore, the second message frame carries the link identifiers of the multiple links and the MAC addresses of the second device associated with the links. It is noteworthy that the link identifiers of the multiple links in the second message frame may be determined by the first message frame. That is, the link identifiers of the multiple links in the second message frame may be the same as the link identifiers of the multiple links in the first message frame. Alternatively, the link identifiers of the multiple links in the second message frame may have corresponding association relationships with the link identifiers of the multiple links in the first message frame.

In this way, after the first device receives the second message frame, the re-setup of multiple links may be completed based on the link identifiers of the multiple links, the MAC addresses of the first device and the MAC addresses of the second device associated with the multiple links.

Figure 4B:
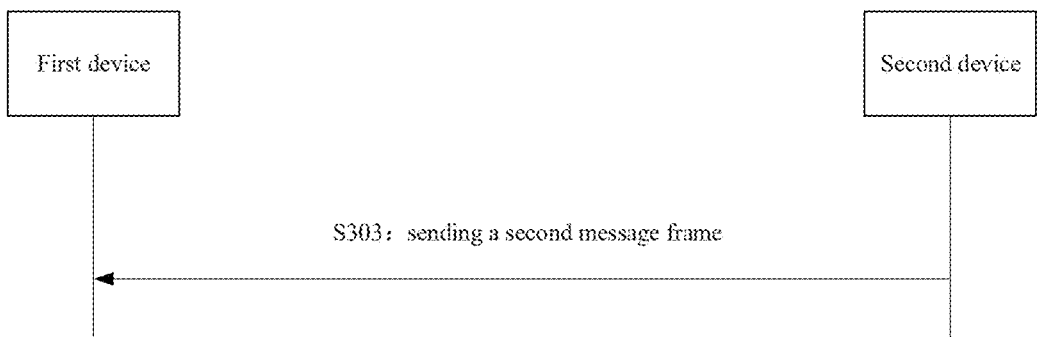
FIG. 4B is a fourth flowchart illustrating a multi-link re-setup method according to some embodiments.

It is noteworthy that the second device can send the second message frame independently rather than sending the second message frame in response to the first message frame. As illustrated in FIG. 4B, the second device, as the initiator of the multiple links, may perform step S303 of sending the second message frame to the first device. Moreover, the second message frame may also be a message frame broadcasted to the plurality of first devices, which includes the link identifiers of the multiple links to be set up and the MAC addresses of the second device corresponding to the multiple links.

In some embodiments, if the first device supports a communication on one link at a time point, the first message frame sent by the first device may carry one MAC address and link identifiers of the multiple links. The MAC address may be shared by the multiple links. Alternatively, the first message frame may carry one link identifier of a link to be used by the link for communication at the current moment, where the link identifier of the link may be one of the link identifiers of the multiple links in the second message frame described above.

In some embodiments, in response to that the second device supports a communication on one link at a time point, MAC addresses associated with the multiple links are the same or different; and in response to that the second device supports communications on multiple links at a time point, MAC addresses associated with the multiple links are different.

In some embodiments, the second device can be an AP device with a full capability, and the full capability means a capability of sending and receiving data on multiple links at the same time. Therefore, in order to avoid the address confliction of the multiple links when sending and receiving data simultaneously, different links have different MAC addresses In some embodiments, the second device can support the communication on one link at a time point. Similar to the first device, the second message frame carries the link identifiers of the multiple links, and either different MAC addresses corresponding to the multiple links or the same MAC address corresponding to the multiple links.

In some embodiments, the method further includes: sending a ciphertext of an encryption key based on the MAC address associated with a link, in which the ciphertext is a result of encrypting the encryption key of the link.

In some embodiments, the second device can encrypt the encryption key based on the MAC address associated with the link during the communication process, and send the ciphertext obtained by encrypting the encryption key to the first device. After receiving the ciphertext, the first device can decrypt the ciphertext based on the MAC address associated with the link for which the ciphertext is received, so that the corresponding encrypted data can be obtained.

In this way, the encryption keys transmitted on the multiple links can be encrypted respectively using the corresponding MAC addresses, so that the encryption keys can be used separately on the links, thereby improving the data transmission security.

In some embodiments, in response to the first message frame, sending the second message frame includes: in response to that no link had been set up with the first device before the second device receives the first message frame to perform the re-setup of the multiple links, sending the second message frame carrying an AID to the first device.

In some embodiments of the disclosure, before the first device sends the first message frame to request the re-setup of links with the second device, the first device had been associated with the second device. At this time, the re-setup of multiple links is to reset the configuration of the multiple links between the first device and the second device. In addition, it is possible that the first device has not set up any link with the second device, but the first device had set up links with another device. At this time, the re-setup of multiple links is to set up new links with the second device.

Therefore, if the first device has not set up a link with the second device before sending the first message frame, there is no corresponding AID between the first device and the second device, and thus the second device needs to carry the AID in the second message frame and assign it to the first device.

In this way, the first device can set up links with the second device based on the AID assigned by the second device after obtaining the second message frame.

In some embodiments, in response to the first message frame, sending the second message frame includes: in response to the first message frame configured to reset configurations of links that have been set up between the first device and the second device, sending the second message frame carrying an assigned AID assigned or sending the second message frame not carrying an AID.

Compared with the above embodiments, if an association relationship has been set up between the first device and the second device, then the first device has already acquired the AID assigned by the second device. Therefore, in this case, in the re-setup process, it does not need to carry an AID in the second message frame or carry an assigned AID in the second message frame, for easy of identification by the first device.

The disclosure also provides the following examples.

In the Wi-Fi communication technologies that support the multi-link, it is defined that a station (STA) or an AP may be used as a MLD. For a non-AP MLD, each STA associated with the MLD can be a non-AP station. For an AP MLD, each STA associated with the MLD can be an AP.

For a MLD, the MAC addresses are used to separately identify the management entities of the MLD. For example, the multiple links between the non-AP MLD and the AP MLD can be identified separately using different MAC addresses.

When resetting the configuration of the links of MLD, a re-association request or a multi-link re-setup request can be used to re-set up the multiple links with a MLD with which links had been set up, to achieve the reset of the configuration of the links, or the re-setup of links with another MLD.

In some embodiments, if the STA supports multiple links, but only one link can be used for communication at a time point, the information units carried in a multi-link re-setup request frame or a re-association request frame sent by the STA for requesting the re-setup are shown in Table 1 below.

TABLE 1

| Link1 | MAC address 1 | Link2 | MAC address 2 | . . . |
|---|---|---|---|---|

The MAC address 1 and the MAC address 2 can be the same or different. When the MAC address 1 and the MAC address 2 are the same, the Temporal Keys (TKs) and Key Encrypt Keys (KEKs) negotiated under the multiple links use the same MAC address. When the MAC address 1 and the MAC address 2 are different, the TKs and KEKs negotiated under the multiple links use different MAC addresses.

If the STA supports multiple links and support simultaneous communications on multiple links at a time point, the information units carried in the multi-link re-setup request frame or the re-association request frame sent by the STA for requesting the re-setup are shown in Table 2 below.

TABLE 2

| Link1 | MAC address 1 | Link2 | MAC address 2 | . . . |
|-------|---------------|-------|---------------|-------|

The MAC address 1 is different from the MAC address 2, and the TKs and KEKs negotiated under the links use different MAC addresses.

It is noteworthy that the above STA can be understood as the first device in the above embodiments that sends the multi-link re-setup request frame, i.e., the first message frame in the above embodiments.

For the AP supporting simultaneously sending and receiving data on the multiple links, it is understandable that after receiving the multi-link re-setup request frame sent by the first device (i.e., STA), the second device in the above embodiments feeds back a multi-link re-setup response frame or a re-association response frame, i.e., the second message frame in the above embodiments, which may carry the information units shown in Table 3 below.

TABLE 3

| Link1 | MAC address 1 | Link2 | MAC address 2 | . . . |
|-------|---------------|-------|---------------|-------|

The AP supports that the multiple links use respectively different MAC addresses.

In the re-setup of multiple links with the same AP with which links have been set up, the above multi-link re-setup request frames or re-association request frames can be encrypted and transmitted using the negotiated TKs and KEKs. It does not need to assign a new AID to the STA or an assigned AID can be carried in the response frame when sending the multi-link re-setup response frame or the re-association response frame.

If the STA re-sets up multiple links with an AP with which no link has been not set up, the AP can assign an AID to the STA and send the multi-link re-setup response frame or the re-association response frame carrying the assigned AID to the STA.

The above technical solution of the disclosure can reduce the signaling overhead and re-set up multiple links by interacting via the multi-link re-setup request frame and the response frame at a time, thereby improving the efficiency of the links and reducing the power consumption of the device.

Figure 5:
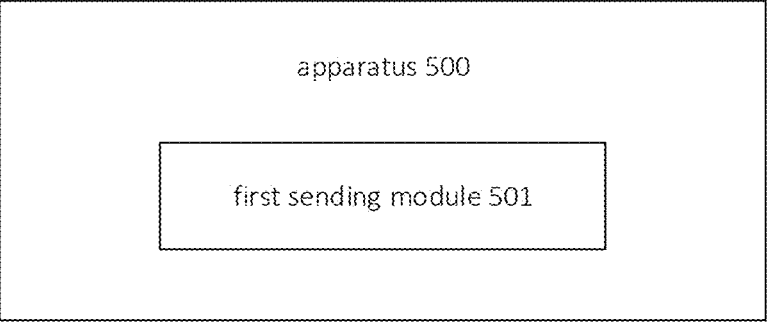
FIG. 5 is a first block diagram illustrating a multi-link re-setup apparatus according to some embodiments.

As illustrated in FIG. 5, embodiments of the disclosure also provide a multi-link re-setup apparatus 500, applied in a first device. The apparatus includes: a first sending module 501.

The first sending module 501 is configured to send a first message frame. The first message frame includes: link identifiers of multiple links between the first device and a second device and MAC addresses of the first device, and the multiple links are associated with the MAC addresses of the first device one by one respectively.

In some embodiments, in response to that the first device supports a communication on one link at a time point, MAC addresses associated with the multiple links are the same or different; and in response to that the first device supports communications on at least two links at a time point, MAC addresses associated with the multiple links are different.

In some embodiments, the apparatus further includes: a first receiving module and a decrypting module.

The first receiving module is configured to receive a ciphertext of an encryption key.

The decrypting module is configured to determine an encryption key corresponding to a link by decrypting the ciphertext based on the MAC address associated with the link.

In some embodiments, the first message frame includes: a multi-link re-setup request message frame; or a re-association request message frame.

In some embodiments, the apparatus further includes: a second receiving module and a setup module.

The second receiving module is configured to receive a second message frame for responding to the first message frame.

The establishing module is configured to set up the multiple links based on the second message frame.

In some embodiments, the second message frame includes: link identifiers of the multiple links and MAC addresses of the second device, and multiple links are associated with the MAC addresses of the second device one by one respectively.

Figure 6:
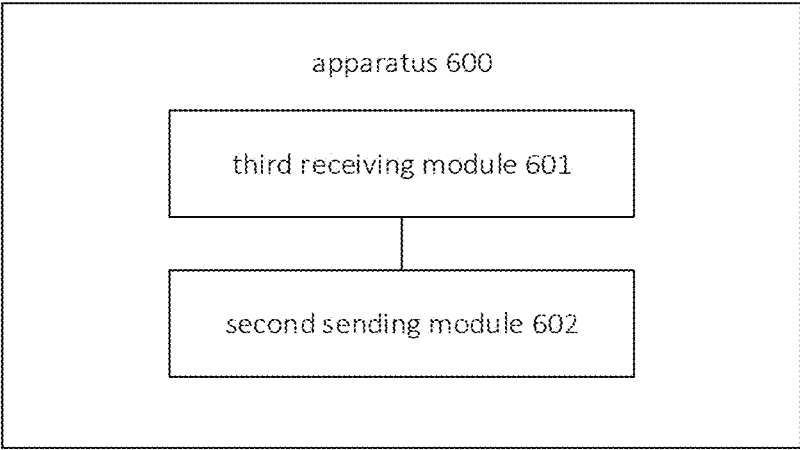
FIG. 6 is a second block diagram illustrating a multi-link re-setup apparatus according to some embodiments.

As illustrated in FIG. 6, embodiment of the disclosure also provide a multi-link re-setup apparatus 600, applied in a second device. The apparatus includes: a third receiving module 601 and a second sending module 602.

The third receiving module 601 is configured to receive a first message frame sent by a first device.

The second sending module 602 is configured to, in response to the first message frame, send a second message frame. The second message frame includes: link identifiers of multiple links between the first device and the second device and MAC addresses of the second device, and the multiple links are associated with the MAC addresses of the second device one by one respectively.

In some embodiments, in response to that the second device supports a communication on one link at a time point, the MAC addresses associated with the multiple links are the same or different; and in response to that the second device supports communications on multiple links at a time point, the MAC addresses associated with the multiple links are different.

In some embodiments, the apparatus further includes: a third sending module.

The third sending module is configured to send a ciphertext of an encryption key based on the MAC address associated with a link, in which the ciphertext is a result of encrypting the encryption key of the link.

In some embodiments, the second sending module includes: a first sending submodule.

The first sending submodule is configured to: in response to that no link had been set up between the second device and the first device before receiving the first message frame to perform the re-setup of the multiple links, send the second message frame carrying an AID to the first device.

In some embodiments, the second sending module 602 includes: a second sending submodule.

The second sending submodule is configured to: in response to the first message frame configured to reset links that had been set up between the first device and the second device, send the second message frame carrying an assigned AID or the second message frame not carrying the AID.

Figure 7:
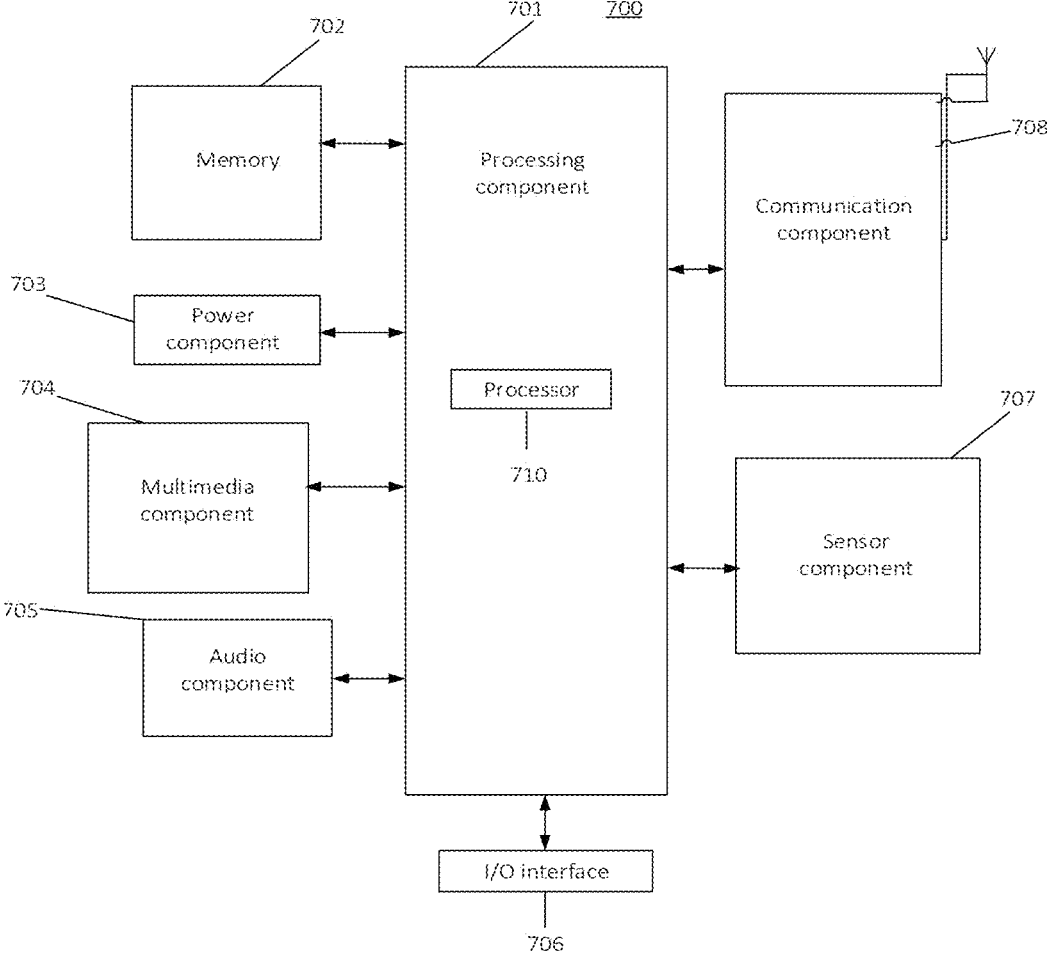
FIG. 7 is a first schematic diagram illustrating a multi-link re-setup device according to some embodiments.

FIG. 7 is a block diagram illustrating a multi-link re-setup device 700 according to some embodiments. For example, the device 700 may be a mobile phone, a computer, a digital broadcasting terminal, a message transceiver device, a game console, a tablet device, a medical device, a fitness device and a personal digital assistant.

As illustrated in FIG. 7, the device 700 may include one or more of the following components: a processing component 701, a memory 702, a power component 703, a multimedia component 704, an audio component 705, an input/output (I/O) interface 706, a sensor component 707, and a communication component 708.

The processing component 701 typically controls overall operations of the device 700, such as the operations associated with display, telephone calls, data communications, camera operations, and recording operations. The processing component 701 may include one or more processors 710 to perform all or part of the steps in the above described method. Moreover, the processing component 701 may include one or more modules which facilitate the interaction between the processing component 701 and other components. For example, the processing component 701 may include a multimedia module to facilitate the interaction between the multimedia component 704 and the processing component 701.

The memory 702 is configured to store various types of data to support the operation of the device 700. Examples of such data include instructions for any applications or methods operated on the device 700, contact data, phonebook data, messages, pictures, video, etc. The memory 702 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or optical disk.

The power component 703 provides power to various components of the device 700. The power component 703 may include a power management system, one or more power sources, and any other components associated with the generation, management, and distribution of power in the device 700.

The multimedia component 704 includes a screen providing an output interface between the device 700 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 704 includes a front-facing camera and/or a rear-facing camera. When the device 700 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 705 is configured to output and/or input audio signals. For example, the audio component 705 includes a microphone (MIC) configured to receive an external audio signal when the device 700 is in an operation mode, such as a call mode, a recording mode, and a voice recognition mode. The received audio signal may be further stored in the memory 702 or transmitted via the communication component 708. In some embodiments, the audio component 705 further includes a speaker to output audio signals.

The I/O interface 706 provides an interface between the processing component 701 and peripheral interface modules, such as a keyboard, a click wheel, buttons, and the like. The buttons may include, but are not limited to, a home button, a volume button, a starting button, and a locking button.

The sensor component 707 includes one or more sensors to provide status assessments of various aspects of the device 700. For instance, the sensor component 707 may detect an open/closed status of the device 700, relative positioning of components, e g., the display and the keypad, of the device 700, a change in position of the device 700 or a component of the device 700, a presence or absence of user contact with the device 700, an orientation or an acceleration/deceleration of the device 700, and a change in temperature of the device 700. The sensor component 707 may include a proximity sensor configured to detect the presence of nearby objects without any physical contact. The sensor component 707 may also include a light sensor, such as a Complementary Metal Oxide Semiconductor (CMOS) or Charge-Coupled Device (CCD) image sensor, for use in imaging applications. In some embodiments, the sensor component 707 may also include an accelerometer sensor, a gyroscope sensor, a magnetic sensor, a pressure sensor, or a temperature sensor.

The communication component 708 is configured to facilitate communication, wired or wirelessly, between the device 700 and other devices. The device 700 can access a wireless network based on a communication standard, such as WiFi, 2G, or 3G. or a combination thereof. In some embodiments, the communication component 708 receives a broadcast signal or broadcast associated information from an external broadcast management system via a broadcast channel. In some embodiments, the communication component 708 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In some embodiments, the device 700 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described method.

In some embodiments, there is also provided a non-transitory computer readable storage medium including executable instructions, such as the memory 702, executable by the processor 710 in the device 700, for performing the above method. For example, the non-transitory computer-readable storage medium may be a ROM, a Random Access Memory (RAM), a CD-ROM, a magnetic tape, a floppy disc, and an optical data storage device.

Figure 8:
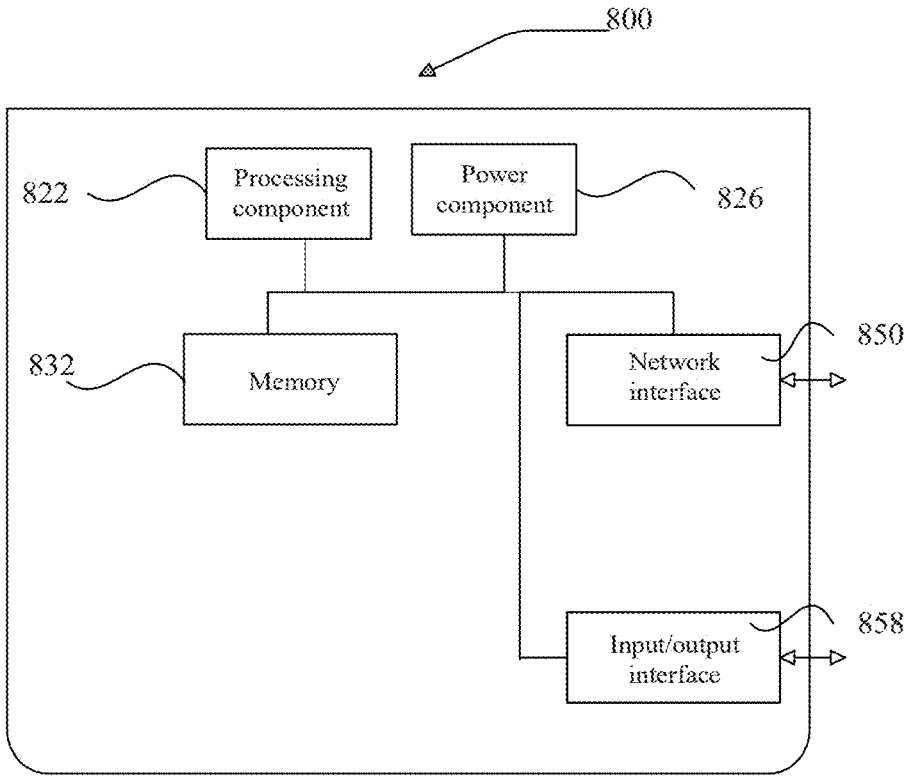
FIG. 8 is a second schematic diagram illustrating a multi-link re-setup device according to some embodiments.

FIG. 8 illustrates a structure of another multi-link re-setup device 800 according to some embodiments of the disclosure. The device may be an AP device according to the embodiment of the disclosure. For example, the device 800 may be provided as a network device. As shown in FIG. 8, the device 800 includes a processing component 822, which includes one or more processors, and a memory resource represented by a memory 832 for storing instructions executable by the processing component 822, such as application programs. The application programs stored in the memory 832 may include one or more modules, each module corresponds to a set of instructions. In addition, the processing component 822 is configured to execute instructions to perform any of the above methods previously applied to the device.

The device 800 may also include a power component 826 configured to perform power management of the device 800, a wired or wireless network interface 850 configured to connect the device 800 to the network, and an I/O interface 858. The device 800 may operate based on an operating system stored on the memory 832, such as Windows Server™, Mac OS X™, Unix™, Linux™, FreeBSD™ or the like.

The embodiments of the disclosure provide a technical solution of the multi-link re-setup. In this method, the first message frame for resetting up the multiple links contains both the link identifiers of the multiple links and the corresponding MAC addresses, so that one first message frame can carry the MAC addresses of the multiple links. Compared with the message frame including only one link identifier and/or one MAC address, the first message frame can facilitate the rapid setup or re-setup of the multiple links, so that the devices can communicate on the multiple links. Therefore, a signaling overhead can be effectively saved and a power consumption generated by the devices during the re-setup process is reduced.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as examples only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A multi-link re-setup method, performed by a first device, the method comprising:

sending a first message frame, wherein the first message frame comprises: link identifiers of multiple links between the first device and a second device, and Media Access Control (MAC) addresses of the first device, the multiple links are associated with the MAC addresses of the first device, respectively;

receiving a second message frame for responding to the first message frame, wherein the second message frame comprises: the link identifiers of the multiple links and MAC addresses of the second device, and the multiple links are associated with the MAC addresses of the second device, respectively, wherein a link identifier of a link in the first message frame is same as the link identifier of the same link in the second message frame for mutual confirmation of the link between the first device and the second device, and wherein in response to no link having been set up between the second device and the first device before sending the first message frame to perform re-setup of the multiple links, the second message frame carries an Association Identifier (AID); and setting up the multiple links based on the second message frame.

2. The method of claim 1, wherein the first message frame comprises at least one of:

a multi-link re-setup request message frame; or a re-association request message frame.

3. A multi-link re-setup method performed by a second device, the method comprising:

receiving a first message frame sent by a first device, wherein the first message frame comprises: link identifiers of multiple links between a first device and the second device, and Media Access Control (MAC) addresses of the first device, and the multiple links are associated with the MAC addresses of the first device, respectively; and in response to the first message frame, sending a second message frame, wherein the second message frame comprises: the link identifiers of the multiple links between the first device and the second device, and MAC addresses of the second device, the multiple links are associated with the MAC addresses of the second device, respectively, a link identifier of a link in the first message frame is same as the link identifier of the same link in the second message frame for mutual confirmation of the link between the first device and the second device, and wherein in response to the first message frame, sending the second message frame comprises:

in response to no link having been set up between the second device and the first device before receiving the first message frame to perform re-setup of the multiple links, sending the second message frame carrying an Association Identifier (AID) to the first device.

4. The method of claim 3, wherein in response to the first message frame, sending the second message frame comprises:

in response to the first message frame configured to reset links that had been set up between the first device and the second device, sending the second message frame carrying an assigned AID or the second message frame not carrying the AID.

5. A first device, comprising:

a processor; and a memory for storing instructions executable by the processor, wherein the processor is configured to:

send a first message frame, wherein the first message frame comprises: link identifiers of multiple links between the first device and a second device, and Media Access Control (MAC) addresses of the first device, the multiple links are associated with the MAC addresses of the first device, respectively;

receive a second message frame for responding to the first message frame, wherein the second message frame comprises: the link identifiers of the multiple links and MAC addresses of the second device, and the multiple links are associated with the MAC addresses of the second device, respectively, wherein a link identifier of a link in the first message frame is same as the link identifier of the same link in the second message frame for mutual confirmation of the link between the first device and the second device, and wherein in response to no link having been set up between the second device and the first device before sending the first message frame to perform re-setup of the multiple links, the second message frame carries an Association Identifier (AID); and set up the multiple links based on the second message frame.

6. The first device of claim 5, wherein the first message frame comprises at least one of:

a multi-link re-setup request message frame; or
a re-association request message frame.

* * * * *